United States Patent [19]

Stowe

[11] Patent Number: 4,570,710

[45] Date of Patent: Feb. 18, 1986

[54] METHOD FOR PREVENTING WELLBORE DAMAGE DUE TO FINES MIGRATION

[75] Inventor: Lawrence R. Stowe, Plano, Tex.

[73] Assignee: Mobil Oil Corporation, New York, N.Y.

[21] Appl. No.: 622,514

[22] Filed: Jun. 20, 1984

[51] Int. Cl.$^4$ ...................... E21B 43/12; E21B 49/00
[52] U.S. Cl. .................................. 166/250; 166/305.1
[58] Field of Search ................... 73/38, 155; 166/250, 166/263, 305 R, 305 D, 312

[56] References Cited

U.S. PATENT DOCUMENTS

| | | | |
|---|---|---|---|
| 1,642,245 | 9/1927 | Judy | 166/305 R X |
| 2,188,936 | 2/1940 | Zeidler, Jr. | 166/305 R X |
| 2,348,161 | 5/1944 | Van Duzee | 166/250 X |
| 2,375,865 | 5/1945 | Nebolsine | 166/305 D X |
| 2,907,390 | 10/1959 | Moll et al. | 166/263 X |
| 2,941,597 | 6/1960 | O'Brien | 166/305 R |
| 3,022,827 | 2/1962 | Getzen | 166/305 R X |
| 3,208,528 | 9/1965 | Elliott et al. | 166/305 R |
| 3,796,264 | 3/1974 | Thigpen, Jr. | 166/305 R X |
| 3,839,899 | 10/1974 | McMillen | 73/38 |
| 4,174,753 | 11/1979 | Graham | 166/305 R X |

OTHER PUBLICATIONS

Millhone, Ralph S., "Completion Fluids for Maximizing Productivity—State of the Art", *Journal of Petroleum Technology*, Jan. 1983, pp. 47–55.

*Primary Examiner*—George A. Suchfield
*Attorney, Agent, or Firm*—Alexander J. McKillop; Michael G. Gilman; Charles A. Malone

[57] ABSTRACT

A method for treating a hydrocarbonaceous formation or reservoir having a certain critical salinity rate and critical fluid flow capacity thereby minimizing small particles or fines from plugging critical flow channels near the wellbore, is provided for, which comprises varying in combination the critical salinity rate and the critical fluid flow capacity.

24 Claims, No Drawings

4,570,710

METHOD FOR PREVENTING WELLBORE DAMAGE DUE TO FINES MIGRATION

FIELD OF THE INVENTION

This invention relates to the treatment of formations surrounding hydrocarbon production areas, oil wells, gas wells or similar hydrocarbon containing formations. In one aspect, it relates to controlled fines migration in a formation by controlling the critical fluid flow rate and the concentration of salt in the flowing fluid.

BACKGROUND OF THE INVENTION

Declines in the productivity of oil and gas wells are frequently caused by the migration of fines toward the wellbore of a subterranean formation. Fines, which normally consist of minutely sized clay and sand particles, can plug and damage a formation and may result in up to a 20-fold, and at times total, reduction in permeability. Conventional sand control techniques such as gravel packing and sand consolidation are sometimes ineffective because fines are much smaller than sand grains and normally cannot be filtered or screened out by gravel beds and consolidated sand treatments are restricted to small vertical intervals. In addition, gravel packing and sand consolidation are normally confined to areas surrounding the immediate vicinity of the wellbore. Fines movement, however, can cause damage at points which are deep in the production zone of the formation as well as points which are near the wellbore region.

Normally, these fines, including the clays, are quiescent causing no obstruction to flow to the wellbore by the capillary system of the formation. When the fines are dispersed, they begin to migrate in the production stream and, too frequently, they incur a constriction in the capillary where they bridge off and severely diminish the flow rate.

The agent that disperses the quiescent fines is frequently the introduction of a water foreign to the formation. The foreign water is often fresh or relatively fresh compared to the native formation brine. The change in the water can cause fines to disperse from their repository or come loose from adhesion to capillary walls.

It is well known that the permeability of clay sandstones decreases rapidly and significantly when the salt water present in the sandstone is replaced by fresh water. The sensitivity of sandstone to fresh water is primarily due to migration of clay particles (see "Water Sensitivity of Sandstones," *Society of Petroleum Engineers of AIME*, by K. C. Khilar et al., (Feb. 1983) pp. 55-64). Based on experimental observations, Khilar et al proposed the following mechanism to describe the dependence of water sensitivity in sandstone on the rate of salinity change.

In the case of an abrupt decrease in the salt concentration, a large number of clay particles are released in a short time and consequently, the particle concentration increased rapidly. As the particle concentration increased, more particles are captured due to bridging or "log-jams" at the pore and thus permeability was reduced significantly. Conversely, as the salt concentration is decreased slowly, the clay particles are released over a longer period of time. The particle concentration remains lower and many clay particles do not arrive at the pore at the same time to cause a "log-jam" effect. Therefore, the number of clay particles captured is lower and the reduction in permeability is also lowered. Importantly, it has been shown that there exists a critical particle concentration above which bridging occurs (Khilar et al 1983).

Others have proposed various ways to prevent permeability reductions caused by clay migration or clay expansions. For example, Henderson, U.S. Pat. No. 4,031,959, suggested the use of an aqueous solution of alkaline earth metal hydroxides and a salt of an alkaline earth metal which was injected down a wellbore and into a hydrocarbon reservoir in volume quantities sufficient to fill the pore spaces of said reservoir to some distance from the wellbore. McLaughlin, U.S. Pat. No. 4,366,071 proposed the use of a class of organic polycationic polymer compositions for treating earthen formations such as oil wells to stabilize clay against dispersion and expansion due to water.

Watkins, U.S. Pat. No. 4,018,285 sought to control fines migration by contacting the formation with a dilute resin solution. The resin solution was displaced into the formation via a diluent causing the deposit of a thin resin film. Later the diluent was extracted and the resin cured to the infusible state. The preferred resin was a one-step phenolic type resin which cured at formation temperatures.

Until now, no one has combined the critical rate of salinity decrease with the critical fluid flow rate to control fines migration near the wellbore so as to increase the permeability of a formation and also to increase the production of hydrocarbons.

SUMMARY OF THE INVENTION

The present invention is directed to a method for minimizing the migration of fines in an oil or gas well formation by determining the critical rate of salinity decrease necessary to control the rate of fines release from the formation and the critical fluid flow velocity necessary to carry the released fines through the formation surrounding the wellbore. After determining these rates, a salt solution, at a sufficiently high concentration to prevent fines release, is injected into the wellbore at a rate substantially exceeding the critical fluid flow velocity. Subsequently, the concentration of the flowing salt solution is reduced following a schedule determined by the critical rate of salinity decrease such that fines are slowly released into the flowing saline solution and at a rate such that the concentration of fines is never large enough to cause a "log-jam" at the pore openings. Upon entering the flowing fluid, the fines will be transported deep into the formation.

As the fluid flows into the formation its velocity will decrease and at some point the fluid velocity will fall below the predetermined critical fluid flow velocity. At this point the fines will begin to settle out of the fluid. The injection rate of the flowing salt solution must at all times exceed the critical fluid flow velocity by a factor large enough to transport the fines to a point deep within the formation where subsequent production rates are maintained below the critical fluid flow velocity. Therefore, once deposited deep within the formation, the fines cannot be transported back into the critical flow channels near the wellbore when the well is placed into production.

In another embodiment of this invention, the salt solution can be injected into the formation in a cyclic manner with succeeding cycles being at slightly lower salt concentrations. Each injection cycle causes fines and particles to be released from the formation but in a controlled manner such that the concentration of fines never exceeds the quantity necessary to cause a "log-jam". Therefore, the flowback portion can remove fines from the area around the wellbore. Injection time periods can start short. Then the entire process can be repeated with a larger injection time period until a radial pattern is created in the formation out into the reservoir which is substantially free of fines or particles.

It is an object of the present invention to remove fines from the pores surrounding the wellbore and to transport them to a point deep within the formation where production velocities are maintained below the critical velocity leading to an opening of the most critical flow channels near the wellbore.

It is another object of this invention to deposit the fines deep within the formation which causes the permeability of the formation near the wellbore to be increased.

It is yet another object of the present invention to increase the production of hydrocarbons from the formation by removing fines from the critical flow channels near the wellbore and to transport the fines deep within the formation.

DETAILED DESCRIPTION OF THE PREFERRED EMBODIMENTS

The method of the present invention will work where there exists one wellbore from which the hydrocarbonaceous fluid is produced as well as where there are two different wellbores, i.e. an injection well and a production well. The method is also applicable to situations in which there exists liquid hydrocarbonaceous production or gaseous hydrocarbonaceous production. Under the proper circumstances, the method is equally applicable to removing hydrocarbonaceous fluids from tar sand formations.

In one embodiment of this invention, the critical salinity rate and the critical fluid flow velocity of the formation is determined. This determination is made via methods known to those skilled in the art. One such method is a method as set forth in U.S. Pat. No. 3,839,899 issued to McMillen and which is hereby incorporated by reference. The critical rate of salinity decrease can be determined as referenced in an article authored by K. C. Khilar et al. entitled "Sandstone Water Sensitivity: Existence of a Critical Rate of Salinity Decrease for Particle Capture," which appeared in *Chemical Engineering Science* Volume 38, Number 5, pp. 789–800, 1983. This article is hereby incorporated by reference.

Although this method is particularly beneficial when applied prior to placing a well into production the first time, the method will work in those situations where the wellbore has been previously cleaned by methods known to those skilled in the art. This cleaning procedure can be via acid treating or surfactant usage as known to those skilled in the art. Salts, which can be employed in the practice of this invention include salts such as potassium chloride, magnesium chloride, calcium chloride, zinc chloride, and carbonates thereof, preferably sodium chloride. While injecting the aqueous salt or saline solution of a concentration to prevent fines migration, pressure is applied to the wellbore which causes the salt solution to be forced deep within the formation. The depth to which the salt solution is forced within the formation depends upon the pressure exerted, the permeability of the formation, and the characteristics of the formation as known to those skilled in the art. In order to allow the fines or particles to migrate deeply within the formation, the critical fluid flow velocity of the fines is exceeded. This causes the fines, upon their release, to be transported in the saline solution to a location deep within the formation.

As used herein, the critical salinity rate is defined as the fastest rate of salt concentration decrease which will cause the formation fines or particles to become mobile in a controlled manner such that permeability damage is not observed. Lower rates of salt concentration decrease which cause the fines or particles to dislodge from the formation pore or cavity walls making the fines or particles mobile are acceptable. The concentration of salt required to obtain the desired effect will vary from formation to formation. Also, the paticular salt used will also vary in concentration due to the peculiar characteristics of the formation or reservoir.

As used herein, the critical fluid flow velocity is defined as the smallest velocity of the saline solution which will allow fines or small particles to be carried by the fluid and transported within the formation or reservoir. Lower velocities will not entrain particles and will permit particles to settle from the solution.

As envisioned, the fines which can plug the critical fluid flow paths or channels near the wellbore are removed to a location deep within the formation. The practice of this method can begin when the salt concentration of injected fluid is at a predetermined concentration so that the fines will not be mobile and will adhere to the wellbore pores and critical flow channels. The salinity concentration of the injected fluid should then be lowered continually such that the critical rate of salinity decrease is not exceeded and the migration of the fines is kept below the level which would cause a plugging or "log-jam" effect in the flow channels. This generally will occur when the salinity of the water surrounding the wellbore and in the formation has become mostly fresh water at a controlled rate. When the proper schedule is determined, pressure is applied to the wellbore and the critical fluid flow velocity is exceeded which causes a reversal in the flow of the hydrocarbonaceous mixture containing brackish water. Reversal of the fluid flow away from the wellbore and into the formation is continued for a time sufficient to cause the permeability and the critical flow channels near the wellbore to reach the desired level of permeability. The injection time required to reach the desired permeability level is a function of the critical fluid flow velocity, the predetermined schedule for salt concentration decrease, and the projected depth required to permanently deposit the fines. The net effect will be to continually migrate fines deep into the formation without plugging the formation. This migration of the fines away from the wellbore and into the formation continues until the critical flow area around the wellbore has been cleaned up.

After determining the permeability characteristics of the formation, the fines can be deposited to a depth in the formation where the rate of hydrocarbon production in the formation is below the critical fluid flow velocity which would cause the fines to migrate to the wellbore. As is known by those skilled in the art, the velocity of fluid flow deep within the formation is less than the velocity of hydrocarbon flow in and around the wellbore since the individual channels surrounding the wellbore contain all of the hydrocarbon production and emanate from all the channels in the formation.

Because the volume of the hydrocarbonaceous material in and around the wellbore is a result of the volume of the hydrocarbonaceous material coming from the formation itself, the velocity of the hydrocarbonaceous material near the wellbore is much greater than the velocity of the hydrocarbonaceous material from further or deeper in the formation.

Therefore, the hydrocarbonaceous fluid production is set such that the predetermined level of the critical fluid flow velocity is not exceeded deep within the formation. An excessive production rate would cause an undesired migration of the deposited and pre-existing fines from deep within the formation. Maintenance of the hydrocarbonaceous fluid production at acceptable levels causes the fines to remain deep within the formation and immobile. As is preferred, the rate of hydrocarbon production can now be maintained at rates higher than those expected to cause fines migration under normal operating conditions.

In another embodiment of this invention, fines or particles can be removed from the formation and area around the wellbore in a manner to prevent plugging the wellbore. In the practice of this invention, prior to placing the hydrocarbonaceous fluid well into production a fixed concentration saline solution is injected into the formation. The saline solution is of sufficiently low concentration to cause some of the fines or particles to release from the walls and to be transported deep within the formation when the critical fluid flow velocity of the fines or particles is exceeded. Therefore, sufficient injection pressure is applied which causes the critical fluid flow velocity of the fines or particles to be exceeded in the saline solution. The released fines will deposit in the formation when the critical fluid flow velocity of the fines or particles is not exceeded. When the fines or particles have been deposited at the desired depth within the formation, the injection pressure is reduced. A reduction in the injection pressure below the critical fluid flow velocity of the fines or particles, causes the fines or particles to settle out of the solution. Upon settling from the formation the fines adhere to the walls of the pores or channels deep within the formation.

Once the fines have been deposited deep within the formation, a saline solution, or lower concentration than contained in the first injection, is injected into the formation. The critical fluid flow velocity of the fines or particles is exceeded, causing some of the fines or particles to become mobile. Said fines or particles are released from the formation in a quantity and at a velocity which will not cause a plugging of the critical fluid flow channels near the wellbore. The injection pressure is reduced and the fines settle out deep within the formation. Subsequently, another saline solution, of a still lower concentration than contained in the second injection, is injected into the formation. After reaching the desired depth in the formation, pressure on the saline solution is ceased and the fines settle out.

This procedure of reducing the saline concentration and increasing its flow at a rate to exceed the critical fluid flow velocity of the fines or particles is repeated until the danger of plugging the critical flow channels or pores near the wellbore is alleviated. When this point is reached, the procedure is stopped and the well placed back into production.

In another embodiment of this method, the cyclic procedure above can be modified. Instead of forcing the fines or particles deep into the formation and subsequently depositing them, the injection periods are alternated with production periods. Initially, the injection period is maintained for a time sufficient to obtain a limited penetration into the formation. The saline solution concentration and fluid flow is maintained at a concentration and rate sufficient to remove the fines or particles without causing a "log-jam" effect or plugging. After the injection time period, the saline solution containing the released fines is allowed to flow back into the wellbore and the fines are thus removed by pumping them to the surface. In each successive injection, the salt concentration is reduced below the previous level. This procedure is contained until a radial area extending from the wellbore into the formation is cleared of fines or particles at the desired depth or distance within the formation or reservoir.

Obviously, many other variations and modifications of this invention, as previously set forth, may be made without departing from the spirit and scope of this invention as those skilled in the art readily understand. Such variations and modifications are considered part of this invention and within the purview and scope of the appended claims.

What is claimed is:

1. A method for treating a hydrocarbonaceous formation or reservoir to control the migration of formation or reservoir fines, said formation or reservoir having a certain critical salinity rate and critical fluid flow velocity, where in combination the critical salinity rate is determined, the salinity reduction varied and the critical fluid flow velocity is changed resulting in the minimization of the plugging of pores and channels near the wellbore which comprises the steps of:
    (a) determining the critical salinity rate and the critical fluid flow velocity of the formation or reservoir surrounding the wellbore;
    (b) injecting a saline solution into the formation or reservoir at a velocity exceeding the critical fluid flow velocity and at a saline concentration rate decrease below the determined critical salinity rate which combination is sufficient to cause the fines or particles to be transferred and fixed deep within the formation or reservoir without plugging the formation or wellbore; and
    (c) producing a hydrocarbonaceous fluid from the formation or reservoir at a velocity such that the critical flow velocity is not exceeded deep said formation or reservoir which causes said fines or particles to remain fixed deep within said formation or reservoir which results in a minimization of the plugging of said pores and channels.

2. The method as recited in claim 1 where the saline solution comprises potassium chloride or potassium carbonate.

3. The method as recited in claim 1 where the saline solution comprises calcium chloride or calcium carbonate.

4. The method as recited in claim 1 where the saline solution comprises magnesium chloride or magnesium carbonate.

5. The method as recited in claim 1 where the saline solution comprises zinc chloride or zinc carbonate.

6. The method as recited in claim 1 where the saline solution comprises sodium chloride or sodium carbonate.

7. A method for treating a hydrocarbonaceous formation or reservoir to control the migration of formation or reservoir fines, said formation or reservoir having a certain critical salinity rate and critical fluid flow velocity, where in combination the critical salinity rate is determined, the salinity reduction varied, and the critical fluid flow velocity is changed resulting in the minimization of the plugging of pores and channels near the wellbore which comprises the steps of:

(a) determining the critical salinity rate and the critical fluid flow velocity of the formation or reservoir surrounding the wellbore;

(b) injecting a saline solution into the formation or reservoir at a velocity exceeding the critical fluid flow velocity and at a saline concentration rate decrease below the determined critical salinity rate which combination is sufficient to cause the fines or particles to be transferred and fixed deep within the formation or reservoir without plugging the formation or wellbore;

(c) decreasing the concentration rate of the saline solution to less than that required for some fines to be released, which concentration rate decrease is below the critical salinity rate, and exceeding the critical fluid flow velocity sufficiently to cause fines or particles to become dislodged from the pore and channel walls flow into the formation or reservoir at a rate which will not cause plugging or a "log-jam" effect in the critical flow channels in and around the wellbore;

(d) decreasing again the concentration rate of the saline solution at a concentration rate decrease below the critical salinity rate and repeating step (c) until substantially all the fines or particles have been deposited deep in the formation or reservoir; and (e) producing a hydrocarbonaceous fluid from the formation or reservoir at a velocity such that the critical flow velocity is not exceeded deep within said formation or reservoir which causes said fines or particles to remain fixed deep within said formation or reservoir which results in a minimization of the plugging of said pores and channels.

8. The method as recited in claim 7 where the saline solution comprises potassium chloride or potassium carbonate.

9. The method as recited in claim 7 where the saline solution comprises calcium chloride or calcium carbonate.

10. The method as recited in claim 7 where the saline solution comprises magnesium chloride or magnesium carbonate.

11. The method as recited in claim 7 where the saline solution comprises zinc chloride or zinc carbonate.

12. The method as recited in claim 7 where the saline solution comprises sodium chloride or sodium carbonate.

13. A method for treating a hydrocarbonaceous formation or reservoir to control the migration of formation or reservoir fines, said formation or reservoir having a certain critical salinity rate and critical fluid flow velocity, where in combination the critical salinity rate is determined, the salinity concentration is reduced and the critical fluid flow velocity is changed resulting in the minimization of the plugging of pores and channels near the wellbore which comprises the steps of:

(a) determining the critical salinity rate and the critical fluid flow velocity of the formation or reservoir surrounding the wellbore;

(b) injecting for a substantially short time interval a saline solution into the formation or reservoir at a rate exeeding said critical fluid flow velocity and at a concentration rate decrease below the determined critical salinity rate which is sufficient to dislodge formation fines or particles and move said fines or particles deep within said formation or reservoir without plugging said pores or channels;

(c) stopping the injection of said saline solution and reducing the flow of said saline solution to a flow rate below said critical fluid flow velocity which causes said fines or particles to settle from said saline solution and become deposited deep within said formation or reservoir without plugging said pores or channels near the wellbore;

(d) injecting into the formation or reservoir a saline solution for a time greater than in step (b) which saline solution is of a concentration lower than step (b) but at a velocity exceeding said critical fluid flow velocity which is sufficient to dislodge and mobilize at least some formation fines or particles deep within said formation or reservoir without plugging said pores or channels near said wellbore (e) stopping the injection of said saline solution and reducing the flow of said saline solution to a flow rate below said critical fluid flow velocity which causes said fines or particles to settle from said solution and become deposited to a desired depth within said formation or reservoir without plugging the pores or channels near the wellbore;

(f) repeating steps (d) and (e) until sufficient fines or particles have been moved into the formation or reservoir to a desired depth or distance without plugging said pores or channels near said wellbore; and (g) producing a hydrocarbonaceous fluid from the formation or wellbore.

14. The method as recited in claim 13 where the saline solution comprises potassium chloride or potassium carbonate.

15. The method as recited in claim 13 where the saline solution comprises calcium chloride or calcium carbonate.

16. The method as recited in claim 13 where the saline solution comprises magnesium chloride or magnesium carbonate.

17. The method as recited in claim 13 where the saline solution comprises zinc chloride or zinc carbonate.

18. The method as recited in claim 13 where the saline solution comprises sodium chloride or sodium carbonate.

19. A method for treating a hydrocarbonaceous formation or reservoir to control the migration of formation or reservoir fines, said formation or reservoir having a certain critical salinity rate and critical fluid flow velocity where in combination said critical salinity rate is determined, the salinity concentration is reduced, and the critical fluid flow velocity is changed resulting in the minimization of pore and channel plugging sufficiently near the wellbore which comprises the steps of:

(a) determining said critical salinity rate and said critical fluid flow velocity of the formation or reservoir surrounding the wellbore;

(b) injecting a saline solution into the formation or reservoir at a rate exceeding said critical fluid flow velocity and at a concentration rate decrease below the determined critical salinity rate which is sufficient to obtain a substantially limited penetration into the formation or reservoir;

(c) maintaining said saline solution injection rate as in step (b), exceeding said determined critical fluid flow velocity, and decreasing said determined critical salinity rate as in (b) above for a time sufficient to remove at least some of the fines and particles without plugging said pores or channels near said wellbore;

(d) stopping said saline solution injection and allowing said saline solution containing said fines and particles to flow back into said wellbore at a rate below said critical fluid flow velocity which rate is sufficient to avoid plugging said pores of channels with said fines or particles;

(e) removing said saline solution containing said fines from said wellbore along with hydrocarbonaceous fluids produced from said formation or reservoir;

(f) injecting additional saline solution into said formation and reducing the concentration rate of said saline solution below that concentration in (b) and exceeding the critical fluid flow velocity mentioned in step (b) and removing additional fines and particles from said formation or reservoir without plugging said pores or channels;

(g) repeating steps (d), (e) and (f) until a radial area extending from the wellbore into the formation is cleared of fines or particles to a desired depth or distance within said formation or reservoir.

20. The method as recited in claim 19 where the saline solution comprises potassium chloride or potassium carbonate.

21. The method as recited in claim 19 where the saline solution comprises calcium chloride or calcium carbonate.

22. The method as recited in claim 19 where the saline solution comprises magnesium chloride or magnesium carbonate.

23. The method as recited in claim 19 where the saline solution comprises zinc chloride or zinc carbonate.

24. The method as recited in claim 19 where the saline solution comprises sodium chloride or sodium carbonate.

* * * * *